UNITED STATES PATENT OFFICE.

FELIX RICHTER, OF FRANKFORT-ON-THE-MAIN, GERMANY.

PROCESS FOR PURIFYING HYDROCARBONS.

1,098,763.  Specification of Letters Patent.  Patented June 2, 1914.

No Drawing.  Application filed November 23, 1910. Serial No. 593,955.

*To all whom it may concern:*

Be it known that I, FELIX RICHTER, a citizen of the German Empire, residing at Frankfort-on-the-Main, Germany, have invented certain new and useful Improvements in Processes for Purifying Hydrocarbons, of which the following is a specification.

This invention relates to the purification of liquid hydrocarbons especially petroleum and benzol as well as terpenes etc. and consists therein, that the hydrocarbons are subjected to combined treatment with finely divided carbon adapted to condense gases on its surface and oxygen containing gases such as air or with pure oxygen. As the result of such treatment of the hydrocarbons oxygen is condensed at the surface of the carbon and produces strong oxidizing effects on the impurities present in the hydrocarbons, including the sulfur and nitrogen containing impurities, if present in the hydrocarbon to be purified, destroying in this way said impurities, whereas the hydrocarbons themselves remain substantially unchanged.

The purifying process is carried out in such a manner that the impure raw materials are mixed with some kind of finely divided active carbon adapted to condense gases on its surface, whereupon the mixture is brought into thorough contact with the gas containing oxygen, by using shaking devices, blowers or other suitable devices. The purifying action becomes at once perceptible by a violent generation of gases among which sulfurous acid becomes most clearly noticeable owing to its smell. In all cases only a small percentage by weight of the active carbon is needed in order to insure the desired action. After sufficient action of the carbon, the carbon together with adhering impurities is allowed to settle whereupon the hydrocarbons are freed from the solid particles which have not settled by simple filtration.

As active carbon one of the known kinds of carbon may be used such as bone black, blood-carbon or charcoal. Very good results have been obtained by means of active carbon which had been manufactured by distilling a mixture of natural fuels and of mineral matter which contains at the same time lime and clay. Suitable mineral matter is for instance fine ashes. In order to secure good results carbon should be employed which has an exceedingly fine grain; a carbonaceous material which excellently complies with this requirement is the carbon powder which is formed by the handling of coal in briqueting factories. Such carbon powder is not only very cheap because it is an inconvenient waste material in briqueting factories, but is of highest activity. This carbonaceous material consists of the carbon particles which, owing to their exceeding fineness and light weight, fill the air of the briquet factory and are filtered out from the air by the use of very fine filter-cloths and water-jet blowers. In the ordinary manufacture of briquets, the briquets are dried and ground and the fine material above referred to is produced by these operations. The peculiar activity of this fine carbon differs from that made from ordinary ground coal, because it is thought that the fine dust produced in the briquet works has its origin in the finely-divided resins originally contained in the carbonized plants, and in the very tender or fine cellular fabrics of leaves, needles, vegetable pith or medulla and similar parts of the plant. These finer carbon particles separate, owing to the vibrations of the machinery in the manufacture of briquets, from the heavier carbon particles produced from the tougher cellular substance of the wood.

The active finely-divided carbon which is used in accordance with the invention condenses, on the surface of its particles, the air or oxygen-containing gases introduced into the liquid. By such condensation the oxygen of the air obtains higher activity and becomes adapted under the simultaneous influence of the hydrocarbons to produce a strong oxidation of the impurities of the hydrocarbons and under certain conditions, especially if the hydrocarbons are present in the form of terpenes, to further oxidize a small part of the hydrocarbons themselves. However this oxidation of the hydrocarbons themselves which takes place under certain conditions affects only a small part of the hydrocarbons and does not materially influence the purifying effect. By the said oxidation, especially the colloidal substances present in the hydrocarbons are transformed into substances which either fall to the bottom by their own gravity or which cling to the particles of active carbon in consequence of their surface attraction. If sulfur containing impurities are present, as is the case if the material to be purified consists of petroleum, then these impurities are likewise oxidized and made innocuous. If the material to be purified consists of terpenes, then the vegetable slimy substances contained therein and the resin-like substances due to intermediate stages of oxidation are further oxidized and mostly eliminated in the form of resin-like bodies adhering to the carbon particles.

In every kind of hydrocarbons the purifying effect depends on the same principles, viz., activation of oxygen under the influence of condensation on the carbon particles within the hydrocarbons and oxidation of the impurities by such activated oxygen and elimination of the oxidized impurities either by direct falling to bottom by adhering to the carbon particles in consequence of their surface-attracting property.

If it is intended to purify crude petroleum this may be done according to this invention as follows: The oil which is to be purified is intermixed with the above-mentioned artificially-manufactured active carbon in such a manner that for each two liters of crude oil, seventy grams of carbon are taken, and during twelve minutes finely-divided air is blown into the oil-carbon mixture. At the end of this period a further portion of active carbon, seventy grams of carbon to each two liters of oil, is added, and the blowing with finely-divided air is continued for further twenty-eight minutes. If now the blower is shut off, then the carbon impregnated and laden with the impurities quickly falls to bottom in the form of a tar-like ill-smelling mass. The oil over the tar-like mass is colorless, completely free of water and is, after simple filtration, immediately ready for use. After the filtration the oil has only a slight somewhat aromatical smell. The purified oil, if used for lighting purposes, gives during many hours the same light intensity without producing a bad smell and burns with a completely odorless flame. On extinction of the flame only a slight odor is perceived and the lamp-chimney remains clear even after a long duration of burning. This shows that sulfur compounds have not been burned together with the oil because such sulfur compounds would have produced a coating of sulfate of ammonia. The lamp wick is only at its extreme end slightly carbonized which is a proof of the fact, that no nitrogen-containing impurities have been carbonized within the pores of the wick.

What I claim is:

1. A process for purifying liquid hydrocarbons, consisting in mixing them with finely-divided active carbon, and then agitating the mixture while in thorough contact with oxygen-containing gases.

2. A process for purifying liquid hydrocarbons, consisting in mixing them with finely-divided active carbon, the said active carbon consisting of the residue obtained by the dry distillation of a mixture of natural fuel and mineral matter containing clay and lime, and then agitating the mixture while in thorough contact with oxygen-containing gases.

3. A process for purifying liquid hydrocarbons, consisting in mixing them with finely-divided active carbon, bringing the mixture into thorough contact with oxygen-containing gases by blowing the finely-divided gases through the mixture, permitting the finely-divided carbon with the adhering impurities to settle, and then removing the oil from the settled material.

4. A process for purifying crude petroleum, consisting in mixing therewith finely-divided active carbon, bringing the mixture into thorough contact with oxygen-containing gases by blowing the finely-divided gases through the mixture, permitting the finely-divided carbon with the adhering impurities to settle, and then removing the oil from the settled material.

In testimony whereof, I affix my signature in presence of two witnesses.

FELIX RICHTER.

Witnesses:
  JEAN GRUND,
  CARL GRUND.